March 28, 1961
J. W. LOEDING ET AL
2,977,194
METHOD OF REDUCING AQUEOUS RADIOACTIVE
NUCLEAR WASTES TO SOLID FORM
Filed Dec. 3, 1958
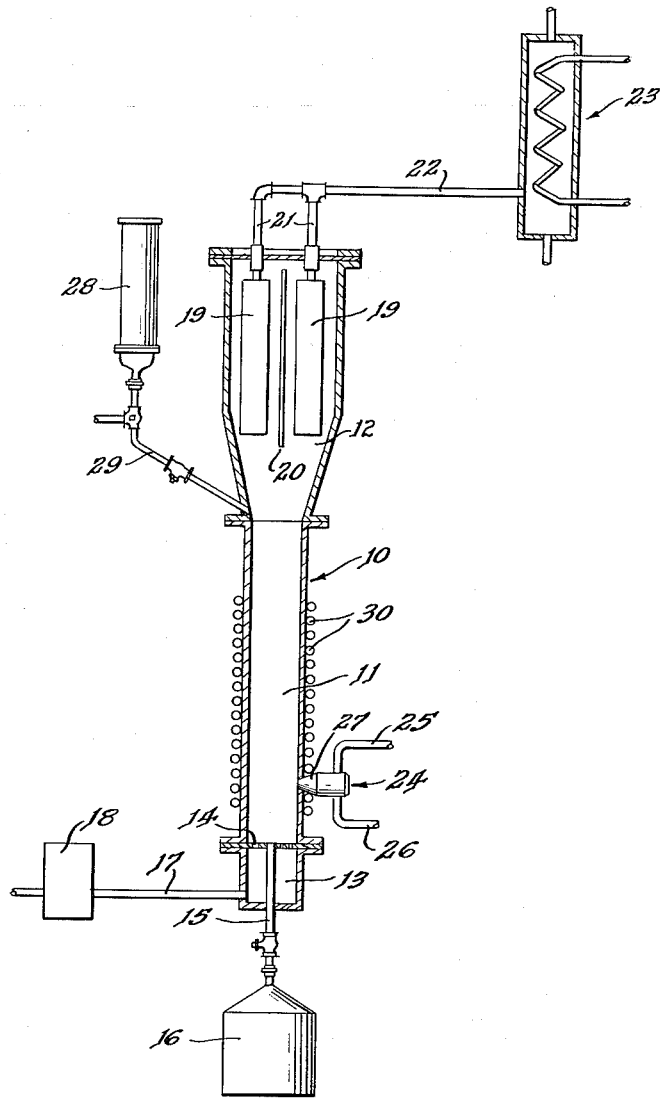
INVENTORS
Albert A. Jonke
BY John W. Loeding
Roland A. Anderson
Attorney

United States Patent Office 2,977,194
Patented Mar. 28, 1961

2,977,194
METHOD OF REDUCING AQUEOUS RADIOACTIVE NUCLEAR WASTES TO SOLID FORM

John W. Loeding, Brookfield, and Albert A. Jonke, Elmhurst, Ill., assignors to the United States of America as represented by the United States Atomic Energy Commission Filed Dec. 3, 1958, Ser. No. 778,041

1 Claim. (Cl. 23—142)

This invention relates to a method of treating aqueous nuclear wastes whereby disposal problems are vastly simplified.

Patent application Serial No. 625,568, filed November 30, 1956, in the name of Stephen Lawroski, now abandoned, discloses a method for the disposal of aqueous nuclear wastes in which the radio-active material is obtained in a form which is easily stored and yet available to obtain potentially valuable isotopes therefrom. This is accomplished by reducing the waste solution to dryness and simultaneously calcining the solids contained therein to the oxides by introducing the solution into a heated fluidized bed formed of the said oxides. Said patent application suggests the use of air and of steam as fluidizing gases.

A problem arising in connection with operation of the described process resides in the fact that ruthenium is volatilized at the temperatures at which it is desirable to carry out the process. Since ruthenium is a radioactive fission product, the condensate obtained is radioactive. This radioactive solution then must be treated to remove the ruthenium therefrom before it can be disposed of. Obviously it is desirable to carry out the operation so that substantially all of the radioactivity remains in the solids.

It is the object of the present invention to carry out the evaporation and calcination of radioactive nuclear wastes in such a way that ruthenium is retained in the solids.

It has now been found that this and other advantages can be obtained by the use of carbon monoxide, preferably in combination with nitrogen, as the fluidizing gas.

The invention will now be described with reference to the accompanying drawing which shows a diagrammatic vertical cross-sectional view of the fluidized bed calciner employed in carrying out the process.

In the drawing a reaction vessel 10 contains reaction chamber 11 and disengaging chamber 12. Reaction chamber 11 is separated from a gas chamber 13 by a porous plate 14. Product delivery conduit 15 leads from reaction chamber 11 to a product delivery reservoir 16. A gas inlet pipe 17, passing through a heater 18 leads into gas chamber 13.

Disengaging chamber 12 contains two banks of filters 19 separated by baffle 20. Off-gas conduits 21 join to form conduit 22 and lead the gas passing through the filters 19 to a condenser 23. Gases leaving the condenser 23 will be exhausted to the atmosphere through a stack (not shown). One bank of filters may be used at a time while a flow of gas is passed in reverse direction through the other bank to remove the dust collected thereby.

Feed to the reaction vessel 10 is by way of a plurality of pneumatic atomizing spray nozzles 24 located above but near to the porous plate 14 and located in a single horizontal plane. The spray nozzles include an air inlet 25, a feed inlet 26, and a mixing chamber 27.

A charge hopper 28 is connected to the upper portion of the reaction chamber 11 by conduit 29. Electric heaters 30 are disposed about the reaction vessel 10. Appropriate shielding (not shown) is provided to protect operating personnel.

To operate the device the reaction chamber 11 is filled to a point above the spray nozzles 24 with granular particles between 20 and 200 mesh in size. A heated gas is passed into gas chamber 13 through air inlet 17 and heater 18. The gas passes through porous plate 14 and up through the particles in the reaction chamber 11, causing the mass of particles to behave very much as a vigorously boiling liquid. This fluidized bed is heated to the desired operating temperature by heaters 30. Feed solution is then introduced into the bed below the surface thereof. The solution is evaporated and the salts contained therein are calcined to the oxide of the elements contained in the solution by contact with the heated particles in the bed. As the oxide is produced it is withdrawn through product delivery conduit 15 and retained in reservoir 16. The wastes will then be stored till short-lived fission products have decayed. The potentially valuable strontium-90 and cesium-137 can then be recovered by leaching or dissolution and precipitation. The gas, carrying the vaporizable portion of the feed, rises and passes through filters 19 which remove entrained solids from the gas. The gas is then condensed in condenser 23 and the condensate collected. The non-condensable gases are then evacuated to the atmosphere through a stack (not shown). If necessary to condensate may be treated by such methods as ion exchange to remove any radioactive materials which have been volatilized.

Experiments made to show the advantages arising from the use of carbon monoxide rather than air as the fluidizing gas will now be described. Experiments were carried out in a 6-inch diameter reactor similar to that employed in the examples in application Serial No. 625,568. The feed was a synthetic solution in which was included radioactive waste from the Idaho Chemical Processing Plant to simulate a typical aqueous nuclear waste. This feed was basically a solution of aluminum nitrate containing minor amounts of other constituents to which had been added radioactive waste including ruthenium. The calciner pressure was maintained between 0 and 5 inches of mercury vacuum by means of a steam jet to reduce the possibility of leakage of radioactive dust and gas. The jet steam and the off-gases were condensed in a common condenser and the volume of the combined condensate was approximately 17 times the volume of the feed. Use of the steam jet was a safety precaution. Table I gives the operating conditions for these runs.

TABLE I

*Operating conditions for waste calcination runs*

Equipment: 6-inch diameter, shielded, fluid-bed calciner.
Feed: Synthetic raffinate solution spiked with Idaho Chemical Processing Plant waste.[a]

| | |
|---|---|
| Starting Bed Particle Size | 20 to 200 mesh. |
| Bed Temperature | 400° C. |
| Fluidizing Gas Rate | 5.8 c.f.m. |
| Blowback Gas Rate | 1.1 c.f.m. |
| Nozzle Gas Rate | 0.72 c.f.m. |
| Feed Rate | 89 to 102 ml./min. |
| Reactor Pressure | 0 to 5 inches Hg vacuum. |
| Run Duration [b] | 2.6 to 7.5 hr. |
| Condensate Volume [c] | 17 times volume of feed. |

[a] Runs 1 and 2 used one part active Idaho Chemical Processing Plant waste to 1000 parts inactive solution; Runs 3 and 4 used 1 to 500.
[b] Run duration includes period with active feed only.
[c] Condensate diluted by condensed steam from vacuum jet.

The distribution of radioactivity in the effluent streams was determined by sampling and analyzing the solid product, the condensate and the off-gas. A single sample of the solid product was collected near the end of each run. The condensate was sampled at intervals of about one hour throughout the run. The off-gas was sampled by metering all or part of the gas through a filter paper for a measured period of time. Results showed that the fission product ruthenium was quantitatively volatilized from the calcined aluminum oxide and collected in the condensate when air was used as the fluidizing gas. Table II summarizes the ruthenium distribution obtained in four typical active runs using air as fluidizing gas.

TABLE II

| Run No. | Ruthenium Activity (Percent in input) | | | | Ruthenium— Material Balance |
|---|---|---|---|---|---|
| | Solids | Condensate | Off-Gas | | |
| | | | Before Filter | After Filter | |
| 1 | not found a | 81 | 0.070 | | 82 |
| 2 | do | 75 | 0.14 | 0.0014 | 76 |
| 3 | do | 69 | 0.17 | 0.0015 | 70 |
| 4 | do | 75 | 0.13 | 0.0020 | 76 | a Where no ruthenium activity was found in the solids, the upper limit is believed to be about 1%.

A run was then made using a mixture of carbon monoxide and nitrogen simulating commercial producer gas. The mixture was used as the fluidizing gas while all other air streams to the calciner were replaced by nitrogen. The concentration of carbon monoxide in the fluidizing gas was 28 volume percent and the flow rate was calculated to be approximately equivalent to that required to convert all the nitrate to nitrogen. All other operating conditions were the same as in previous runs. Table III gives the results of this run.

TABLE III

Feed analysis (c.p.m./ml.)

Gross $\beta$ 5.1×10$^6$
Gross $\gamma$ 1.3×10$^6$
Ru $\gamma$ 0.9×10$^5$
Cs $\gamma$ 8.6×10$^5$

| Run Conditions | Run Time (hr.) | Condensate | | Acidity |
|---|---|---|---|---|
| | | Total $\gamma$ (c.p.m./ml.) | Ru $\gamma$ (Percent of Feed Ru) | |
| No. 31 a | 0.5 | 3,700 | 4.1 | 0.14 N |
| CO—N$_2$ Gas | 1.0 | 2,300 | 2.6 | 6.7 pH |
| Temp., 400° C | 1.5 | 910 | 1.0 | 8.0 pH |
| Feed Rate, 93 ml./min | 2.0 | 730 | 0.8 | 9.0 pH |
| | 2.5 | 1,200 | 1.4 | 8.5 pH |
| | 3.0 | 600 | 0.7 | 8.0 pH |
| Steam Jet Used | 3.5 | 1,350 | 1.5 | 9.0 pH |
| | 4.0 | 630 | 0.7 | 9.0 pH |
| | 4.5 | 330 | 0.4 | 8.0 pH | a Results for run 31 are corrected for condensate dilution by steam jet.

It will be noted that the ruthenium in the condensate was only about 1% of that in the feed, compared with over 50% when air was used as the fluidizing gas at the same calcination temperature. As shown in the data in Table III, all of the nitric acid was destroyed by reaction with carbon monoxide in this run. The condensate had a pH of 8.0 to 9.0. The basicity is due to the steam used in the steam jet which has a normal pH of 8.4. In addition it was found that the gas temperature rose markedly due to the reaction of carbon monoxide with the nitrate decomposition gases. While the bed temperature was maintained at 400° C., the gas temperature in the disengaging section rose to about 700° C.

It is apparent therefore that the use of carbon monoxide decreases carry-over of ruthenium into the condensate and destroys all of the nitric acid in the solution, thereby avoiding nitrate disposal problems and the corrosion problems associated with the evaporation of nitric acid solutions. Moreover, the heat supplied by the reaction decreases the external heat requirement. It is belived that the reason the volatility of ruthenium is suppressed by the use of carbon monoxide is that the volatile ruthenium compound is ruthenium tetroxide and the carbon monoxide chemically reduces the ruthenium to a nonvolatile species. Apparently drastic reducing conditions are necessary, since earlier experiments showed that sodium nitrite added to the feed did not succeed in suppressing the ruthenium.

It will be noted that this invention is not to be limited to the details given herein but that it may be modified within the scope of the appended claim.

What is claimed is:

A method for converting a waste solution containing aluminum nitrate which also contains a minor amount of radioactive ruthenium to solid form wherein the volatility of the ruthenium is inhibited comprising establishing and maintaining a fluidized bed consisting essentially of aluminum oxide particles by passing a mixture of carbon monoxide and nitrogen containing at least 26 volume percent carbon monoxide therethrough, spraying the said waste solution into the fluidized bed below the surface thereof, heating the bed to a temperature of approximately 400° C., removing aluminum oxide and most of the ruthenium from the bottom of the bed as fast as it is formed therein, and condensing the volatilized material.

References Cited in the file of this patent

UNITED STATES PATENTS

| 1,652,119 | Halvorsen et al. | Dec. 6, 1927 |
| 2,714,550 | Miller | Aug. 2, 1955 |
| 2,731,400 | Jahnig et al. | Jan. 17, 1956 |

OTHER REFERENCES

Huff: "Separation of Nitrate and Aluminum from Radioactive Chemical Wastes," Atomic Energy Commission Research and Development Report, IDO 14392, Jan. 15, 1957, pages 3 and 7.

Wilson: "Ruthenium Behavior in Nitric Acid Distillation," Nuclear Science Abstracts, vol. 11, No. 20 Supplement, Oct. 31, 1957, page 1289.